Patented June 13, 1933

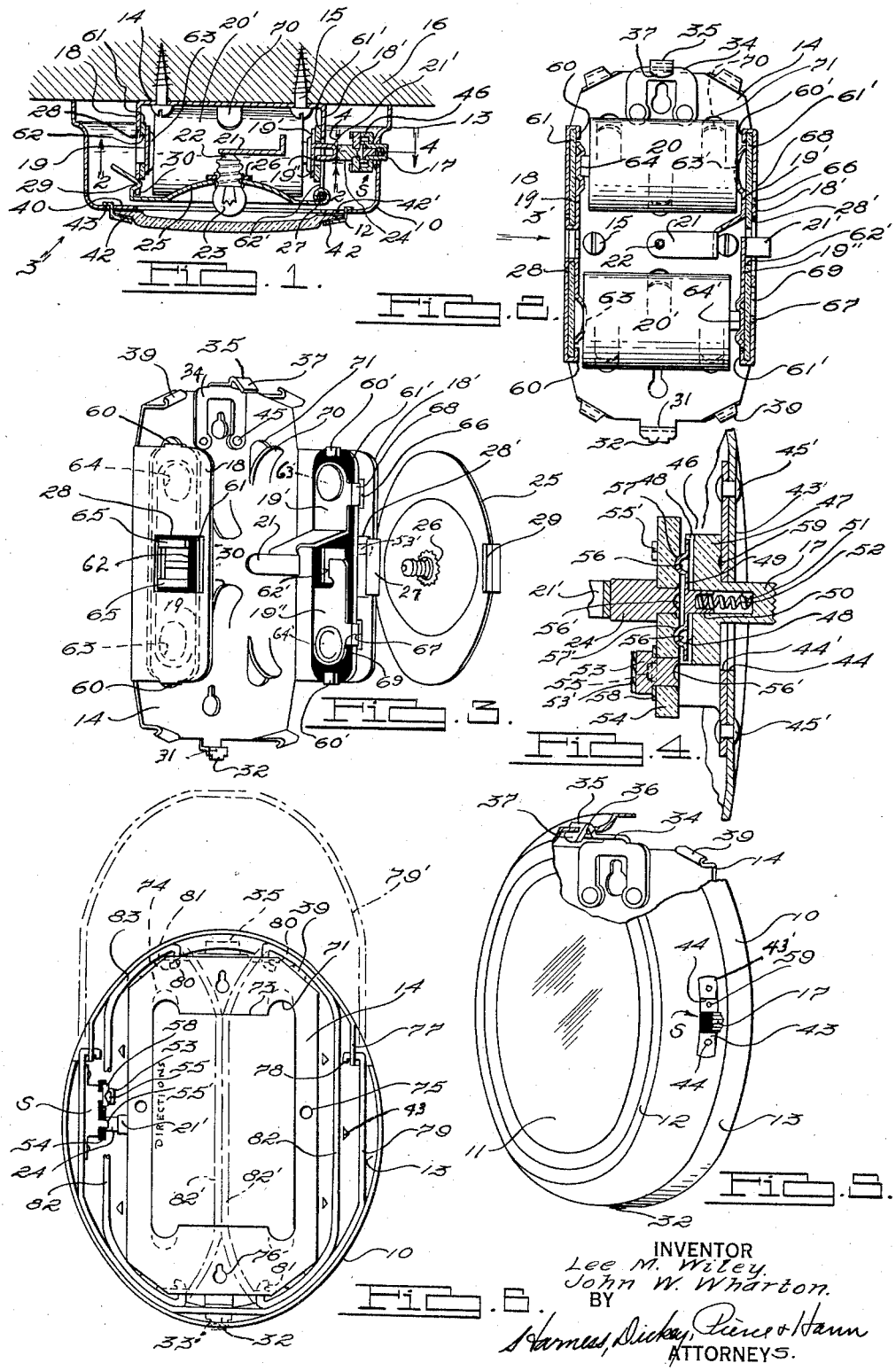

1,913,696

UNITED STATES PATENT OFFICE

LEE M. WILEY AND JOHN W. WHARTON, OF MARION, INDIANA, ASSIGNORS TO DELTA ELECTRIC COMPANY, A CORPORATION OF INDIANA

SELF-CONTAINED LIGHTING UNIT

Application filed November 14, 1930. Serial No. 495,576.

It is an object of this invention to provide what may be termed a "self-contained" light unit adapted to be applied to a flat or similar surface and requiring no external wiring or current source. The unit referred to is suitable for use either as a so-called "dome" light, within a vehicle, or for use as a "wall light" and it may be adapted to various other uses.

Said unit preferably comprises a rounded shell or "turtle-back" casing which forwardly terminates in a flat or other flange to which a lens may be so secured as to cover a light exit opening; and said shell may rearwardly terminate in a "stepped" flange,—exceeding the main body of said casing in width and so proportioned as slidably to receive and to position some or all parts of a complete bulb-and-battery interior assembly.

It will be understood from the foregoing that it is an object of the present invention to provide, by simple means and at moderate cost, a unit that may be easily attached to an overhead surface, or to any vertical or other wall, said unit requiring no complete and separate back or door, distinct from a so-called connection element comprised in the mentioned interior assembly,—said connection element serving not only for the removable or permanent attachment of all requisite interior parts but also to secure the unit to the interior of a top of an automotive vehicle or to any appropriate surface.

It is an object of this invention to provide a unit, of the general character referred to, in which the mentioned connecting plate or its equivalent, preferably channel-shaped in cross-section, not only serves for the attachment of the unit to a wall and for the support of requisite interior parts, but is also adapted to so cooperate with the mentioned casing that the latter may be removed by a suitable local application of thumb pressure to a resilient element. The latter may be exposed through an opening in said casing so that the removal of the casing affords access to the interior assembly (as for the purpose of the inevitable replacement of battery elements, incandescent bulb elements, and the like) without requiring said assembly to be removed from a wall; and preferred embodiments of the invention, in which said casing may carry a novel switch whose operating element projects slightly through an opening therein, may include also a reflector which serves directly as a bulb-socket element and as a conductive element and which is pivoted to one of the forward edges of a pair of flanges provided by the mentioned connecting element,—the other of said flanges then preferably serving as a latch element or as a "keeper" for the pivoted reflector.

The present invention should be understood to include, in addition to preferred details of casing construction and preferred details of switch construction, these being presumably capable of a wide variety of alternative uses, a novel interior assembly which is, in turn, obviously suitable for use in various casings and in cooperation with alternative types of switch mechanism; and especial emphasis is herein placed upon various features of a mentioned connecting plate or element comprised in said interior assembly and provided with novel means for the support of battery elements, conductive elements, contact elements, spacing or positioning elements and/or retaining elements, in addition to the mentioned light bulb and reflecting element.

Other objects of the present invention, including an optional and incidental provision of openings in the mentioned connecting plate which are suitably disposed for the reception of projecting lugs provided upon the corners of a direction card, to retain the latter without the use of additional securing means, and optionally including also special features of handle construction, may be best appreciated from the following description of illustrative embodiments of the invention, taken in connection with the appended claims and the accompanying drawing.

Fig. 1 may be referred to as a substantially median vertical section through a unit illustrative of the present invention, assuming the same to be secured within the top of a car or to some other overhead wall element.

Fig. 2 may then be referred to as a horizontal sectional view, taken in an upward direction and substantially as indicated by the line 2—2 of Fig. 1, but showing battery elements as in place in an interior assembly.

Fig. 3 is a perspective view, taken in the general manner suggested by the arrow 3 of Fig. 1 and the arrow 3' of Fig. 2, but omitting battery elements and showing a reflector as pivotally swung forward favorably to an insertion of battery elements.

Fig. 4 is a longitudinal detail sectional view, taken somewhat as suggested by the line 4—4 of Fig. 1.

Fig. 5 is a perspective front view of a unit secured to a vertical wall, parts being broken away.

Fig. 6 is a rear elevational view,—showing optional features.

Referring first to the more general features of the illustrated embodiment of the invention, the casing 10, whose forward light-exit opening is provided with a lens 11 secured by a bezel 12 is shown as rearwardly terminating in a stepped flange 13, may be referred to as open at the back except as its rearward opening is partially closed by a main connecting element 14. The latter is shown as comprised in an interior organization which is adapted to be inserted through said back opening and to permit attachment of the unit, as by means of screws 15, to some wall 16,—serving completely to close said opening.

The casing 10 will be seen interiorly to carry a switch organization, controlled by an operating element 17, which projects through an opening in said casing; and the mentioned interior assembly may include, in addition to the channel-section element 14 (shown as serving not only for the permanent or removable attachment of the unit but for various additional purposes), a pair of forwardly extending flanges 18, 18' respectively carrying, in an insulated relationship, both a longer longitudinally conductive element 19, adapted to connect battery elements 20, 20' in series, and shorter conductive elements 19' and 19'', respectively carrying integral and oppositely extending resilient contact fingers 21 and 21'. The former of these will be seen to be disposed favorably to engagement with an end contact element 22, provided upon a bulb 23; and the latter to be disposed in constant engagement with a fixed contact element 24, comprised in the mentioned switch organization.

A reflector 25, preferably formed of metal or otherwise rendered conductive and including a threaded boss within which a threaded neck of the bulb 23 may be secured, optionally by means including a special lock nut 26, is shown as pivotally secured at 27,—adjacent the forward edge of an opening 28' provided in the flange 18'. The parallel flange 18 being shown as similarly apertured at 28, cooperating latch and keeper elements 29 and 30 may then be so provided opposite the pivotal connection at 27 as to permit said reflector 25 to be swung forward, upon a forward removal of the casing 10 from its illustrated position, in such manner as to facilitate either a replacement of interior parts such as the battery elements 20, 20', and/or the bulb 23, or any desired adjustment or repairs.

Whether or not the casing 10 is provided, as shown, with what may be termed an open back (the terms front and back being herein used with reference to the direction of light propagation, and not with reference to the position in which a unit of the described character may happen, in a particular instance, to be secured) the casing 10 and the connecting element 14 may advantageously be provided with some simple type of means for releasably holding the same in their illustrated relationship. For example, one end of the intermediate web portion of said connecting element may be provided with an offset and substantially rigid extension 31, including a reduced terminal tongue 32 which is insertable in a suitable slot or opening 33 in the flange 13 of said casing; and the opposite end of said intermediate web may be integrally or otherwise provided with a resilient clip member 34, so terminally rebent as to provide a catch element 35 which is so shaped as to enter a slot 36 in a curved or other main side or end wall of said casing and also to provide both a thumb piece for disengagement of said catch and an inclined guide cam surface 37 facilitating engagement thereof upon placement or replacement of said casing.

An initial positioning and/or replacement of said casing, and its retention in a non-rattling relationship to the interior assembly, may be facilitated by the provision of rebent and substantially hook-like spacing projections 39 at or near the respective corners of the main connecting element 14,—said projections being slidably receivable within the flange 13 and forwardly engageable with the front wall of the channel provided thereby, at times when the edges of the reflector 25, or its equivalent, are in such conductive engagement with flat flange or lens-carrying portion 40 of the front of the casing 10, as to complete a conductive circuit (not necessarily including element 14) upon a closing of the mentioned switch.

To retain the lens 11 (of any desired color and optionally provided with a legend or indicia, when designed for a special use) not only a reduced flange portion 41 of said lens, but also a sheet or sheets 42, 42' of fibrous material may be preassembled within the bezel 12 or its equivalent; and the latter may be secured in any suitable manner,—as by a rebending of spaced integral tongues 43,—shown as extending through small openings provided in the flange 40; and the curved main lateral wall of the casing 10 may advantageously be provided with a small flat area 43', corresponding in diameter to an opening 44, through which the operating element 17 of any suitable switch extends,—pairs of rivets 45 and 45' being shown as employed in securing the clip 34 on the connecting plate 14 and in securing a housing element 46 of the mentioned switch to the casing 10. No rivets, bolts or screws other than those already referred to are required at any point in the entire unit.

In the illustrated switch, the operating element 17 is shown as substantially T-shaped, and as comprising, in addition to a hollow stem portion which is slidable within the opening 44 (the switch housing element 46 being provided with a corresponding opening 44') a main or "head" portion 47 which is guided between parallel walls of the housing element 46. This main portion is preferably slotted, as at 48, favorably to the reception of a conductive bridge element 49 in such manner as to permit a bending or bodily movement thereof while preventing contact thereof with housing 46. This bridge element is shown as also T-shaped in general form, its stem 50 being not only receivable in the mentioned opening 51 in the stem portion of the operating element 17 but preferably provided with resilient advancing means such as a spring 51, also receivable therein. The operating element 17 being formed from insulating material, contact elements 24 and 53 may be supported from the walls of the mentioned housing element by means including an insulating disc 54 through or over which inwardly projecting bent lugs 55, 55', integral with said walls, may so extend as to retain said disc,—pairs of rounded depressions 56, 56' being so provided in said disc and in the mentioned contact elements 24 and 53 as to cooperate with correspondingly rounded bosses 57, 57', provided near the respective ends of the bridge element 49 and adapted alternatively to cooperate with one or the other of the mentioned pairs of depressions.

In case the lighting circuit is to be completed, as herein proposed, through the casing 10, the contact element 53 may be conductively related thereto by the interposition of a suitable element 58 and by extending the pair of lugs 55 through flanges provided thereby. It will be seen that the contact elements 52 and 53 remain stationary relatively to the casing and to the interior assembly at all times, the contact element 24 being normally engaged by the mentioned resilient contact 21'; and the completion of a circuit through the casing 10, the reflector 25 and the bulb 23, by way of the inwardly extending contact element 21 and through batteries 20, 20' and contact 21' may be indicated in some simple manner,—as by the provision of a white dot at 59 upon what has been termed the "head" of the switch operating element 17, or its equivalent.

As to the preferred method of supporting the battery elements 20, 20', in conductive relationship to the mentioned longitudinally extending strips 19, 19' and 19'', the flanges 18 18' are each provided at its respective ends with pairs of rebent lugs 60, 60', each pair serving for the support of a comparatively rigid strip or plate 61, 61', of insulating material. Each strip is provided with a central opening 62, 62' within the outlines of a mentioned opening 28, 28' in the flange 18; and the conductive strip 19 is shown as provided not only with a convexity 63 near one end thereof and with a concavity 64, near the other end thereof (these being respectively adapted to cooperate with complemental terminals of the respective battery elements in a manner assuring a proper positioning of the latter) but also with retaining lugs 65 so offset from a central portion of said strip and rebent over the edges of the opening 62 as to secure said strip in a manner permitting resilient engagement of its respective ends with unlike poles of the respective batteries.

The insulating strip or plate 61' being shown as secured to the flange 18' by means of lugs 60', the flange 18' is shown as provided not only with the substantially central rectangular opening 28', shown as exceeding in dimensions aperture 62' provided in the strip 61' in such manner as to permit the contact finger 21 to project through said openings, but with additional openings at 66 and 67, so positioned and proportioned as to permit the employment of rebent lugs, such as are shown at 68 and 69, in the retention of the respective conductive elements 19' and 19'' in their illustrated positions,—the conductive element 19' being shown as provided, near its end, with a convexity 63' and the conductive element 19'' being similarly provided with a concavity 64', for engagement with complemental pole elements provided upon the respective batteries 20, 20'.

The batteries 20, 20' may be additionally provided with any desired securing and/or spacing means; and it is suggested that, for the purpose here referred to, the intermediate web of the main connecting element 14 have struck therefrom and inwardly deflected a plurality of tongues 70,—three being shown as provided in connection with each battery element; and the openings 71 which are thus incidentally provided may be utilized, as suggested in Fig. 6 only, in securing to the connection element 14 a card 73, having printed thereon any desired advertisement, price list, or directions with reference to the separation of parts, insertion of batteries, the attachment of the unit in either a permanent or removable manner to a supporting wall, or the like. The card 73, is shown as provided, for the purpose referred to, with integral tongues 74, at its respective corners, each tongue extending beyond the edge of an opening 71; but the dimensions of the card 73 may nevertheless be such as to avoid covering any openings 75 or 76 provided for the attachment of the entire unit to a wall, as by means of the screws 16. These screws are shown as extending through a pair of symmetrically disposed openings 75, which are disposed on the shorter diameter of the unit and so formed as to render the removal of the unit dependent upon the withdrawal of said screws; but the holes 76 will be seen to be of key-hole type and such that a preliminary lifting as a unit secured by any screws extending therethrough enables the unit to be temporarily removed (for use as a "trouble" light) without the withdrawal of said screws.

It will be obvious that a unit of the described character, when detachably secured, and especially in case its dimensions are such that it can be conveniently held in one hand, may be used in somewhat the same general manner as an ordinary flashlight; and its general utility may be further enhanced by the provision of any suitable normally concealed handle or handles. For example, to facilitate carrying the unit in the general manner of a lantern, edge portions of the flange 13 being struck inward as suggested at 77, the substantially parallel deflected portions so provided may be laterally pierced and shaped suitably to the reception of hooks or inwardly extending ends 78 upon a bail 79,—shown as so shaped and proportioned as normally to lie in the "step" provided by the flange 13 although movable to such a position as that suggested by the dotted lines 79'. Alternatively or additionally, lugs integral with or adjacent to the spacing hooks or guide fingers 39, interfitting within the flange, said lugs being inwardly deflected and suitably apertured, as at 80, may receive inwardly extending ends 81 of a pair of symmetrically disposed handle elements 82, adapted, when inclined or rounded portions 83 thereof are lifted from their illustrated relationship to the "step" of flange 13, to be swung to such positions as are suggested at 82' and then to be engaged either by the fingers of a user or to receive a belt, or the like, suitably threaded therethrough and so supporting the unit as to leave the hands of the user free.

The mode of use of the described novel unit being obvious from an inspection of the drawing, and the functions served by each of the devices comprised therein having been indicated in connection with the description of the latter, it should be additionally understood not only that various features of the device might be independently used but also that numerous modifications, additional to any suggested herein, might easily be devised by skilled workers, if informed of the foregoing,—all without departure from the scope of the present invention, as the latter is indicated above and in the following claims. For example, it will be obvious not only that the contact element 53 may so engage some cooperating contact 53' connected with the reflector as to avoid inclusion of the casing 10 in the light circuit, but also that, whether secured on said casing or comprised in the interior assembly, a so-called "pull chain" switch may be substituted, according to the requirements or the taste of the user, for the illustrated switch S.

We claim:

1. In a self-contained lighting unit: a casing element having in its front a light-exit opening and having in its back an assembly-passing opening; and a complete bulb-and-battery interior assembly so proportioned, relatively to said last-mentioned opening, as to render said casing applicable thereover,—said interior assembly including a main connecting element, which, being substantially channel-shaped in cross section, comprises forwardly extending lateral flanges, said flanges being provided with means for the retention of insulating strips for the support of conductive elements and conductive elements being secured thereon suitably for engagement with the respective ends of battery elements disposed therebetween.

2. A self-contained lighting unit readily changeable from one wall to another comprising a casing having a glass in a portion of its wall to permit light to project from within the casing to the exterior thereof, such casing having its back disposed substantially in a plane so it may fit a plane wall surface, lighting means within the casing and including a battery therein, and means for fastening the unit against the wall in the aforesaid manner, said last means being located within the margin in the back of the casing wall so as to be concealed thereby.

3. A self-contained lighting unit readily changeable from one wall to another comprising a casing having side walls and a front wall, one of the walls having a glass for allowing light to project from within the casing to the exterior thereof, said side walls terminating at the back in portions located in substantially the same plane, so that the back of the casing may be fitted against a plane wall surface, lighting means within the casing and including a battery therein, and means for holding the unit against the wall surface, said holding means being concealed by the casing when it is fitted against the wall.

4. A self-contained lighting unit readily changeable from one wall to another comprising a casing, lighting means including a battery located within the casing, said casing having one side so arranged as to fit snugly against a wall surface, a glass in another side of the casing to permit light to project from within the casing to the exterior thereof, and means for holding the unit against such wall surface, said holding means being located within the margin of the first side so as to be concealed when the unit is against the wall surface.

5. A self-contained lighting unit readily changeable from one wall to another comprising a lighting assembly including a battery, means for fastening the assembly on a plane wall surface such as the wall of a room, an open sided casing provided with a lens or glass and being of such proportions as to be telescopically associated with the lighting assembly, to conceal the battery, and means for releasably holding the casing and lighting assembly together.

6. A self-contained lighting unit readily changeable from one wall to another comprising a lighting assembly including a battery, means for fastening the assembly on a plane wall surface such as the wall of a room, an open sided casing provided with a glass and being of such proportions as to be telescopically associated with the lighting assembly to conceal the battery, and means for releasably holding the casing and lighting assembly together, the open side of such casing having its edge disposed substantially in a plane, and being adapted to be substantially disposed in the plane of said wall surface.

7. A self-contained lighting unit readily changeable from one wall to another comprising a lighting assembly including a bulb and battery, an open sided casing provided with a glass, and being of such proportions as to be telescopically associated with the lighting assembly and to conceal the battery, said unit having one side opposite the glass, disposed in substantially a plane so as to be disposed substantially flush against the plane wall surface, means for releasably fastening the unit on such wall in such relation thereto, and means for releasably holding the casing and lighting assembly together.

8. A self-contained lighting unit comprising a casing having a front opening for allowing light rays to emanate from within the casing, and a back opening, an element adapted to be inserted into the back opening and having spaced legs projecting into the interior of the casing, a reflector mounted on the legs of the element, a battery mounted on the element, and a bulb adapted to cooperate with the reflector, said bulb, element, reflector, and battery constituting an assembly which may unitarily be inserted into the back opening of the casing.

9. A self-contained lighting unit comprising a casing having a front opening for allowing light rays to emanate from within the casing, and a back opening, an element adapted to be inserted into the back opening and having spaced legs projecting into the interior of the casing, a reflector pivotally mounted on one of the legs of the element, a battery mounted on the element and a bulb adapted to cooperate with the reflector, said bulb, element, reflector, and battery constituting an assembly which may unitarily be inserted into the back opening of the casing.

10. A self-contained lighting unit readily changeable from one wall to another comprising a plate element, means on said element for supporting a bulb and battery, means for releasably fastening the plate against a plane wall surface such as the wall of a room, a casing having a front opening for allowing light from within the casing to emanate therefrom, and a back opening, said casing being adapted to telescope over the bulb and battery on the plate with the bulb and battery passing through the back opening, the back side edges of the casing terminating in substantially the plane of the plate, and means for releasably securing the casing to the plate so that the casing may be removed without disturbing the assembly of the plate, bulb and battery.

11. A self-contained lighting unit readily changeable from one wall to another comprising a plate element, means on said element for supporting a bulb and battery, means for releasably fastening the plate against a plane wall surface such as the wall of a room, a casing having a front opening for allowing light from within the casing to emanate therefrom, and a back opening, said casing being adapted to telescope over the bulb and battery on the plate with the bulb and battery passing through the back opening, the back side edges of the casing terminating in substantially the plane of the plate, and means for releasably securing the casing to the plate so that the casing may be removed without disturbing the assembly of the plate, bulb and battery, said casing in its operative position concealing the means for securing the plate to the wall surface.

In testimony whereof we affix our signatures.

LEE M. WILEY.
JOHN W. WHARTON.